(12) United States Patent
Wax et al.

(10) Patent No.: US 11,335,362 B2
(45) Date of Patent: May 17, 2022

(54) WEARABLE MIXED SENSOR ARRAY FOR SELF-VOICE CAPTURE

(71) Applicant: Bose Corporation, Framingham, MA (US)

(72) Inventors: Aric J. Wax, Watertown, MA (US); Michael Shay, Uxbridge, MA (US)

(73) Assignee: Bose Corporation, Framingham, MA (US)

( * ) Notice: Subject to any disclaimer, the term of this patent is extended or adjusted under 35 U.S.C. 154(b) by 4 days.

(21) Appl. No.: 17/002,254

(22) Filed: Aug. 25, 2020

(65) Prior Publication Data

US 2022/0068298 A1   Mar. 3, 2022

(51) Int. Cl.
| | |
|---|---|
| *G10L 25/84* | (2013.01) |
| *H04R 5/04* | (2006.01) |
| *H04R 5/033* | (2006.01) |
| *G06N 20/00* | (2019.01) |
| *G06F 3/01* | (2006.01) |
| *H04R 3/00* | (2006.01) |

(52) U.S. Cl.
CPC .............. *G10L 25/84* (2013.01); *G06F 3/011* (2013.01); *G06F 3/017* (2013.01); *G06N 20/00* (2019.01); *H04R 3/005* (2013.01); *H04R 5/033* (2013.01); *H04R 5/04* (2013.01)

(58) Field of Classification Search
CPC ..... G10L 25/84; G10L 25/78; G10L 21/0232; G10L 21/0216; G10L 15/22; G10L 2021/02166; G10L 2021/02168; H04R 3/005; H04R 5/033; H04R 5/04; H04R 1/1083; G06N 20/00; G06F 3/011; G06F 3/017
See application file for complete search history.

(56) References Cited

U.S. PATENT DOCUMENTS

| | | | |
|---|---|---|---|
| 7,433,484 B2 | 10/2008 | Asseily et al. | |
| 8,401,212 B2 | 3/2013 | Puria et al. | |
| 8,626,498 B2 | 1/2014 | Lee | |
| 8,675,884 B2 | 3/2014 | Yehuday et al. | |
| 8,792,648 B2 | 7/2014 | Kim et al. | |
| 8,983,096 B2 | 3/2015 | Smith et al. | |

(Continued)

OTHER PUBLICATIONS

Maruri et al. V-Speech. Proceedings of the ACM on Interactive, Mobile, Wearable and Ubiquitous Technologies, 2018, Abstract [online], [retrieved on Jan. 21, 2021]. Retrieved from the Internet <URL: https://www.semanticscholar.org/paper/V-Speech%3A-Noise-Robust-Speech-Capturing-Glasses-Maruri-Lopez-Meyer/d872d0e47eae05e44724a8b7f1cd2384562bfa0f>.

*Primary Examiner* — Yogeshkumar Patel
(74) *Attorney, Agent, or Firm* — Bond, Schoeneck & King, PLLC

(57) ABSTRACT

A wearable for capturing self-voice using a mixed sensor array, including a microphone generating a microphone signal and positioned to capture a user's voice; an accelerometer generating an accelerometer signal and positioned to capture the user's voice; and a controller receiving the microphone signal and the accelerometer signal and configured to generate a mixed output signal, wherein the mixed output signal comprises a microphone signal component and an accelerometer signal component, wherein a ratio of the microphone signal component and the accelerometer signal component is related to a value of a noise metric representing a magnitude of ambient noise.

20 Claims, 4 Drawing Sheets

(56) References Cited

U.S. PATENT DOCUMENTS

| | | |
|---|---|---|
| 9,094,764 B2 | 7/2015 | Rosener |
| 9,226,083 B2 | 12/2015 | Puria et al. |
| 9,313,572 B2 | 4/2016 | Dusan et al. |
| 9,363,596 B2 | 6/2016 | Dusan et al. |
| 9,381,110 B2 | 7/2016 | Huber et al. |
| 9,438,985 B2 | 9/2016 | Dusan et al. |
| 9,576,588 B2 | 2/2017 | Goldstein et al. |
| 9,620,116 B2 | 4/2017 | Dadu et al. |
| 9,924,265 B2 | 3/2018 | Lopez Meyer et al. |
| 9,949,048 B2 | 4/2018 | Isberg et al. |
| 9,997,173 B2 | 6/2018 | Dusan et al. |
| 10,045,112 B2 | 8/2018 | Boesen et al. |
| 10,111,017 B2 | 10/2018 | Hillbratt et al. |
| 2014/0270231 A1* | 9/2014 | Dusan ............ G10L 25/90 381/74 |
| 2015/0256949 A1* | 9/2015 | Vanpoucke ......... H04R 25/606 381/317 |
| 2017/0078464 A1 | 3/2017 | Cordourier Maruri et al. |
| 2018/0146307 A1* | 5/2018 | Petersen ............ H04R 25/552 |
| 2018/0368975 A1* | 12/2018 | Easter ............ A61N 1/36036 |
| 2021/0118461 A1* | 4/2021 | Boeen ............ G10L 21/0216 |

* cited by examiner

WEARABLE MIXED SENSOR ARRAY FOR SELF-VOICE CAPTURE

BACKGROUND

This disclosure is generally directed to self-voice capture using a mixed sensor array. More specifically, this disclosure is directed to self-voice capture with an array comprising at least one microphones and at least one accelerometer.

SUMMARY

All examples and features mentioned below can be combined in any technically possible way.

In an aspect, a wearable for capturing self-voice using a mixed sensor array, comprising: a microphone generating a microphone signal and positioned to capture a user's voice; an accelerometer generating an accelerometer signal and positioned to capture the user's voice; and a controller receiving the microphone signal and the accelerometer signal and configured to generate a mixed output signal, wherein the mixed output signal comprises a microphone signal component and an accelerometer signal component, wherein a ratio of the microphone signal component and the accelerometer signal component is related to a value of a noise metric representing a magnitude of ambient noise.

In an example, the wearable further includes a second microphone generating a second microphone signal, wherein the microphone signal component is comprised of the microphone signal and the second microphone signal.

In an example, the wearable further includes a second accelerometer generating a second accelerometer signal, wherein the accelerometer signal component is comprised of the accelerometer signal and the second accelerometer signal.

In an example, the noise metric is determined according to a time-average of the microphone signal.

In an example, the time average of the microphone signal is calculated when a voice activity detector does not detect the user's voice.

In an example, the time average is spectrally weighted.

In an example, the noise metric is determined according to a machine learning algorithm.

In an example, the noise metric is determined according to a magnitude of a beam formed from, at least, the first microphone signal and the second microphone signal, the beam being directed to exclude the user's voice.

In an example, the ratio of the microphone signal component and the accelerometer signal component is determined according weights stored in a look up table.

In an example, the wearable comprises one of: headphones, earbuds, glasses, or a mobile device.

According to another aspect, a method for capturing self-voice with a mixed sensor array, comprising: receiving a microphone signal from a microphone positioned to capture a user's voice; receiving an accelerometer signal from an accelerometer positioned to capture the user's voice; and generating a mixed output signal comprising a microphone signal component and an accelerometer signal component, wherein a ratio of the microphone signal component and the accelerometer signal component is related to a value of a noise metric representing a magnitude of ambient noise.

In an example, the method further includes the step of receiving a second microphone signal from a second microphone, wherein the microphone signal component is comprised of the microphone signal and the second microphone signal.

In an example, the method further includes the step of receiving a second accelerometer signal from a second accelerometer, wherein the accelerometer signal component is comprised of the accelerometer signal and the second accelerometer signal.

In an example, the noise metric is determined according to a time-average of the microphone signal.

In an example, the time average of the microphone signal is calculated when a voice activity detector does not detect the user's voice.

In an example, the time average is spectrally weighted.

In an example, the noise metric is determined according to a machine learning algorithm.

In an example, the noise metric is determined according to a magnitude of a beam formed from, at least, the first microphone signal and the second microphone signal, the beam being directed to exclude the user's voice.

In an example, the ratio of the microphone signal component and the accelerometer signal component is determined according weights stored in a look up table.

In an example, the wearable comprises one of: headphones, earbuds, glasses, or a mobile device.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Many wearable products feature a microphone or an array of microphones for capturing a user's voice (alternately referred to in this disclosure as "self-voice"). These wearable products can use the captured voice for any number of reasons, such as to communicate with another person (e.g., cellular communication), to dictate messages, or to provide commands to a local or remote virtual assistant (e.g., Siri, Alexa, etc.).

Self-voice capture is, however, degraded in the presence of noise (e.g., wind noise, music, ambient sounds, etc.), reducing the clarity of the captured self-voice. It is therefore desirable to provide a method for the capture of self-voice with high clarity in the presence of noise.

One such method is to employ a different type of sensor, such as a voice-band accelerometer, rather than a microphone to capture the user's voice. The voice-band accelerometer can capture the user's voice by detecting vibrations traveling through the user's bone and tissue, and, as such, is largely immune from ambient noise, which does not produce similar vibrations at the accelerometer. The quality of the accelerometer output signal is, however, lower than the quality of the microphone signal and a user will often be able to perceive the difference between voice captured by the microphone and voice captured by the accelerometer. Accordingly, there exists a need in the art for a wearable that can employ both microphones and voice-band accelerometers and advantageously provide to the user the output of the accelerometer, microphone, or mix between the two, depending on the level of ambient noise.

Figure 1:
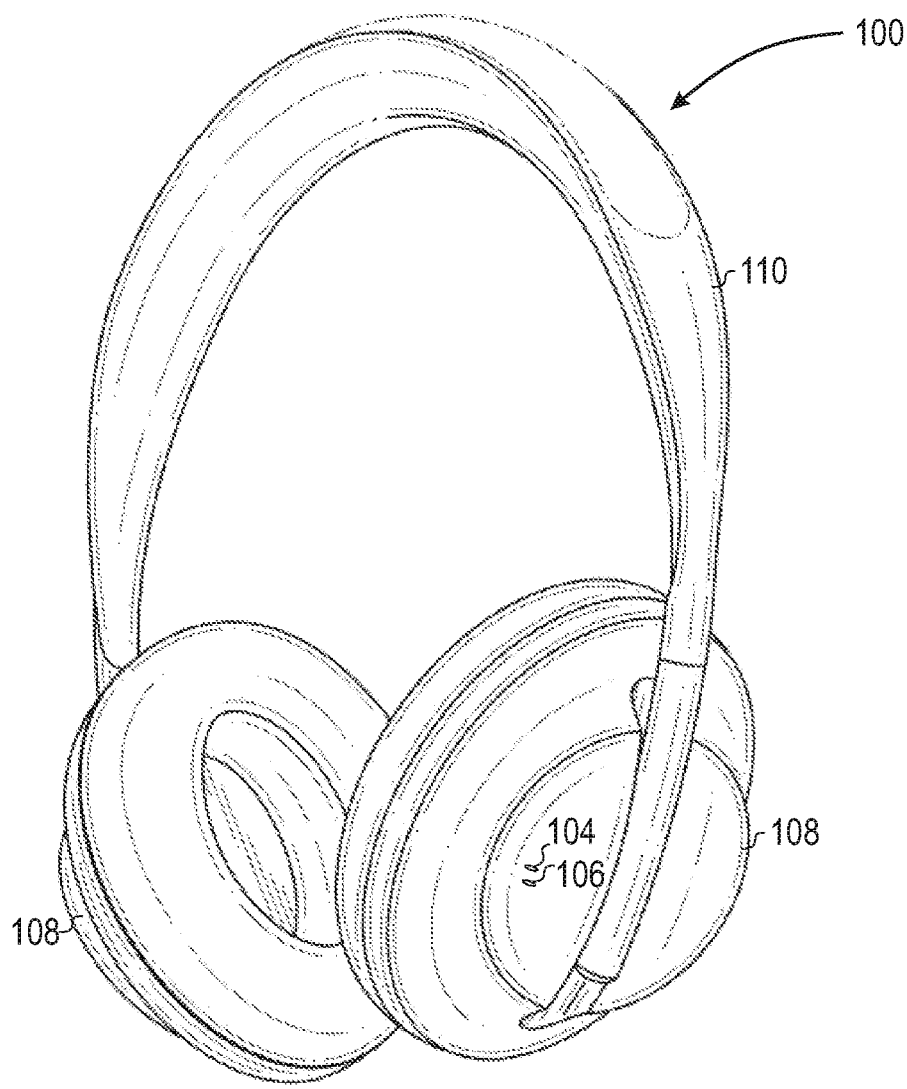
FIG. 1 depicts a perspective view of a pair of headphones including a mixed sensor array, according to an example.

There is shown in FIG. 1 an example wearable, a pair of headphones 100, having a mixed sensor array for improved self-voice capture. The mixed sensor array comprises a microphone 102 and an accelerometer 104, each respectively being positioned in a location suitable for capturing the user's voice. Although only one microphone 102 and one accelerometer 104 are shown in FIG. 1, it should be understood that any number of microphones 104 and accelerometers 106 can be used.

The microphone 102 and accelerometer 104 can be positioned at any location suitable for capturing self-voice. For example, if, as shown in FIG. 1, the wearable is a pair of headphones, the sensors can be disposed in an earpiece 108. This is only provided as an example, and locations that are suitable for capturing the user's voice will depend, at least in part, on the type of and characteristics of the sensor. Thus, microphone 102 can be positioned anywhere suitable for capturing the acoustic waves of the self-voice. This can include, as shown in FIG. 1, the earpiece 108, headband 110, or in-line with an audio cable. In an alternative example, headphones 100 can include a boom on which microphone 102 is disposed. In addition, it will be understood that the location of the microphone will depend in part on the characteristics, such as the sensitivity, of microphone used. It will also depend on whether multiple microphones 104 are employed in an array. For example, an array of microphones 104 can be used to capture the user's voice. These microphones 104 can be positioned at multiple points about the headset 100 and used, e.g., together with known beamforming techniques to direct a beam toward a user's mouth or away from a source of noise. In such an array, each microphone will often be positioned in a manner that enhances the performance of the array as whole, and thus each microphone is not necessarily positioned in a location that is optimal for self-voice capture were only one microphone used.

Likewise, accelerometer 104 can be positioned at any location suitable for detecting vibrations as a result of the user's speech. In most examples, the accelerometer will be positioned at a location in contact with or near to the user's head so that vibrations conducted by the user's bone and tissue as a result of self-voice are received at accelerometer 104. For example, as shown in FIG. 1, accelerometer 104 can be disposed in earpiece 108, however other suitable locations are contemplated. Like microphone 102, the location of accelerometer 104 will depend, in part, on the characteristics and number of accelerometers used. Indeed, multiple accelerometers 106 can be disposed about headphones 100 in an array.

FIG. 1, which shows an example of a pair headphones 100, is only one example of such a wearable that can feature a mixed sensor array. As used in this disclosure, a wearable is device that is worn by a user or otherwise held against user during typical use. Examples of wearables include headphones (on-ear headphones, over-ear headphones, in-ear headphones, etc.), earbuds, and smart glasses such as Bose Frames.

Figure 2:
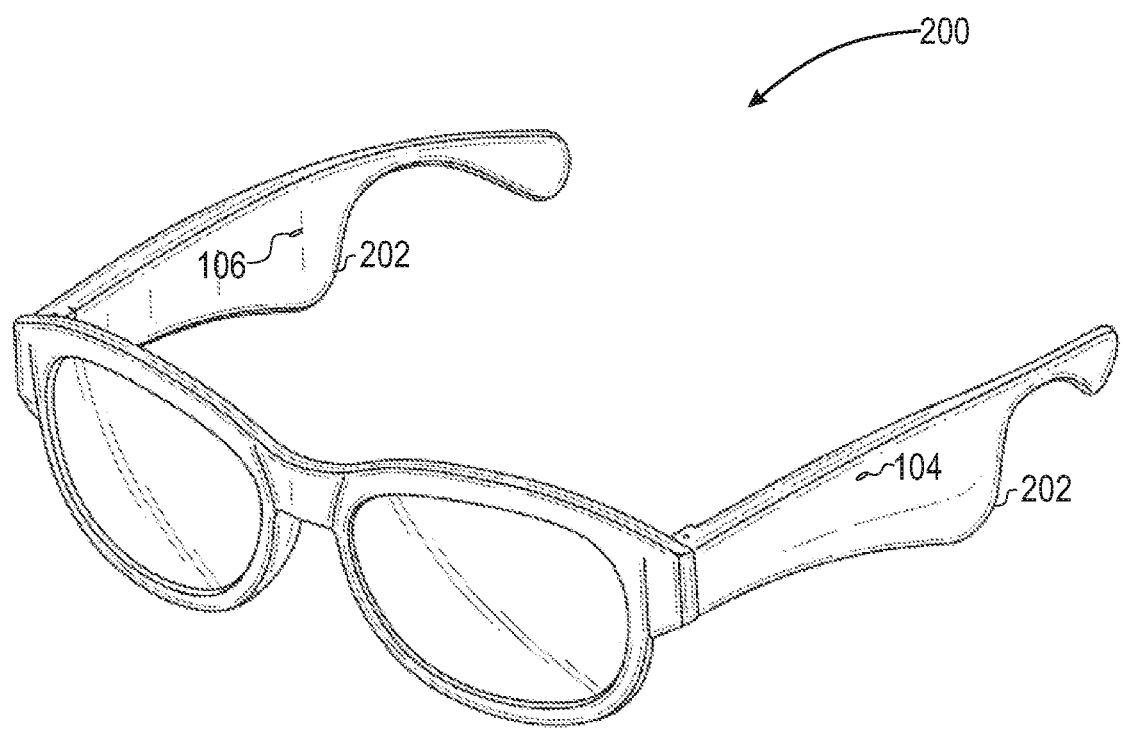
FIG. 2 depicts a perspective view of a pair of frames including a mixed sensor array, according to an example.
Figure 3:
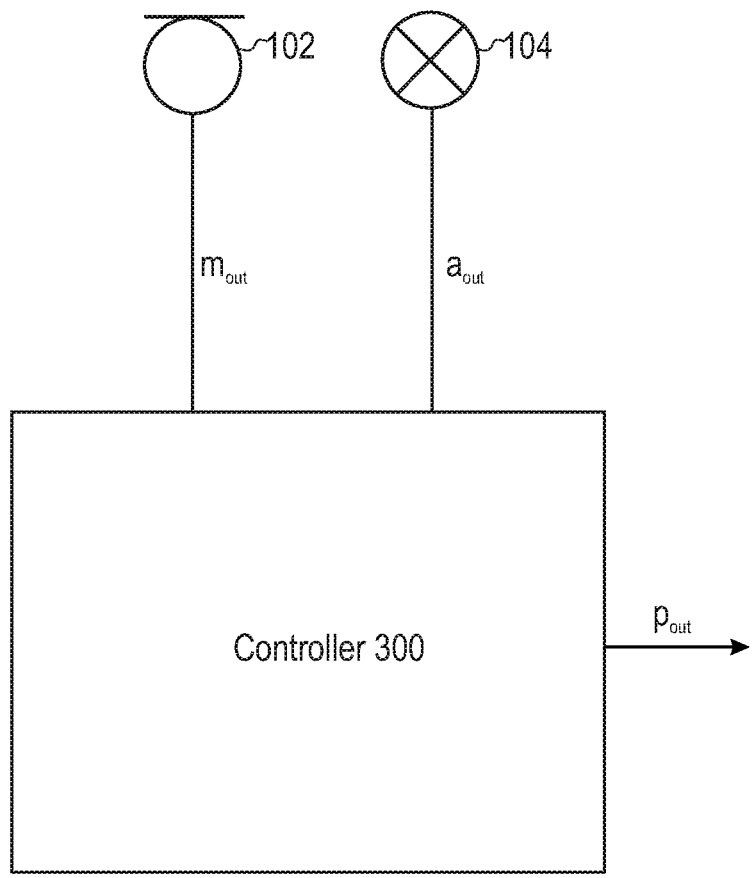
FIG. 3 depicts a block diagram of a controller in communication with a mixed sensor array, according to an example.

As an example, FIG. 2 depicts another such wearable, a pair of Bose Frames 200. As shown in FIG. 2, frames 200 includes a mixed sensor array comprising microphone 102 and accelerometer 104, which are both disposed in the temples 202 of frames 200. Like the example of headphones 100, the locations of microphone 102 and accelerometer 104 are only provided as examples. As described above, microphone 104 can be disposed on frames 200 anywhere suitable for capturing the acoustic waves produced by the user while speaking and will depend, in part, upon the characteristics and number of microphones used. Similarly, accelerometer 104 can be disposed anywhere on frames 200 suitable for capturing vibrations produced by the user's voice and will depend upon the characteristics and number of accelerometers used.

In one example, the wearable 100, 200 can include a controller 300 in communication with microphone 102 and accelerometer 104. Controller 300 receives microphone signal $m_{out}$ from microphone 102 and accelerometer signal $a_{out}$ from accelerometer 104. Controller 300 is configured to produce an output signal $p_{out}$ that includes a microphone signal component and an accelerometer signal component. The relative magnitudes of the microphone signal component and the accelerometer signal component are based, at least in part, on a noise metric that represents a magnitude of the ambient noise. If the noise metric indicates that the ambient noise is low (i.e., the microphone 104 can produce a microphone signal with good clarity and quality) then the mix will predominantly feature the microphone 102 signal component, because this will produce the highest quality output signal in the presence of low noise. If, however, the noise metric indicates that the ambient noise is high (i.e., microphone 104 will not produce a microphone signal with good quality and clarity) then the output signal mix will predominantly feature the accelerometer 102 signal component because this will offer the highest self-voice clarity in the presence of noise.

In various examples, controller can be implemented as a microcontroller, including a processor and a non-transitory storage medium storing program code that, when executed by the processor, carries out the various functions of controller 300 as described herein. Alternatively, controller 300 can be implemented in hardware, such as an application-specific integrated circuit (ASIC) or field-programmable gate array (FPGA). In yet another example, the controller can be implemented as a combination of hardware, firmware, and/or software. In one example, controller can be disposed in the wearable itself (e.g., in headphones 100 or frames 200). In an alternative example, controller 300 can be connected to the wearable by a wired or wireless connection. For example, headphones 100 or frames 200 can be connected by a wired or wireless connection to a mobile device (e.g., a smart phone), which can receive microphone signal $m_{out}$ and accelerometer signal $a_{out}$ and be programmed to perform the processing to function as controller 300. Thus, in this example, the processor and non-transitory storage medium of the mobile device form controller 300.

It should be understood that, in addition to mixing microphone signal $m_{out}$ and accelerometer signal $a_{out}$, controller 300 can perform additional signal processing (e.g., filtering) of the output signal as a whole or of components individually. Thus, the microphone signal component and accelerometer signal component of the output signal can be derived from (but not necessarily identical to) the microphone signal $m_{out}$ and accelerometer signal $a_{out}$, respectively.

While the above description is provided for a single microphone signal $m_{out}$ and single accelerometer signal $a_{out}$, to the extent that there are multiple microphones 102, controller 300 can receive multiple microphones signal $m_{out}$, and to the extent that there are multiple accelerometers 104, controller 300 can receive multiple accelerometer signals $a_{out}$. The microphone signal component of $p_{out}$ can thus be formed from multiple microphone signals $m_{out}$ and the accelerometer signal component can be formed multiple accelerometer signals $a_{out}$. Further, if multiple microphone signals $m_{out}$ and/or multiple accelerometer signal $a_{out}$ are received, it should be understood that some amount of beamforming or mixing can be applied among the multiple signals so that not all microphone signals $m_{out}$ are of equal magnitude in the microphone signal component, and likewise, not all accelerometer signals $a_{out}$ are of equal magnitude in the accelerometer signal components. Indeed, it is conceivable that some subset of microphones signals $m_{out}$ can have a magnitude less than some or all of accelerometer signals $a_{out}$. The mixing of the output signal $p_{out}$, thus, instead requires the magnitude of the microphone signal component (e.g., being a mix of multiple microphone signals $m_{out}$) is greater than or less than the magnitude of the accelerometer signal component (e.g., being a mix of multiple accelerometer signals $a_{out}$) according to the noise metric.

Turning now to a discussion of the noise metric, any noise metric suitable for estimating a magnitude of the ambient noise that can be used to determine the ratio of the microphone signal component and accelerometer signal component can be used. Several examples, however, will be briefly described.

In one example, the noise metric is computed as a time-averaged magnitude of a microphone signal $m_{out}$. Generally speaking, because the accelerometer signal $a_{out}$ naturally excludes ambient noise, the time-average of the ambient noise is the time-average of the microphone signal(s) $m_{out}$ rather than the accelerometer signal(s) $a_{out}$. This time average can be spectrally weighted to emphasize frequencies or frequency ranges and to de-emphasize other frequencies or frequency ranges. In another example, the time-averaged magnitude can further be averaged across frequency values or spectrally weighted frequency values.

To ensure that the time-averaged magnitude is not unduly impacted by the user voice, the noise metric can be only computed when, according to a voice-activity detector, the user is not speaking. Any suitable voice-activity detector can be used. The voice-activity detector can detect the user's voice according to, for example, the microphone signal $m_{out}$, the accelerometer signal(s) $a_{out}$ or some combination of the two. In one example, the accelerometer can be used for voice-activity detection, since the accelerometer will typically only produce a signal when a user is a speaking. Thus, when the accelerometer output exceeds a certain threshold, it can be assumed that the user is speaking and the time-averaged magnitude will cease to be updated. In an alternative example, where at least one other microphone signal $m_{out}$ is received, a sign of the phase difference between two microphone signals $m_{out}$ can be used to detect when the user is speaking (e.g., a positive phase difference will mark when the user is speaking, while a negative phase difference will mark when the user is not speaking, vice versa).

In another example, where multiple microphone signals $m_{out}$ are used, arrays of microphones 102 can be used to form a beam that excludes the user's voice, a magnitude of the beam forming the ambient noise estimate. Because there will be some leakage of user speech into this noise beam, a second beam can be directed at the user to isolate the speech. The speech signal beam can then be used to generate an estimate of leakage speech in the noise beam so that compensation can be applied to improve the noise estimate. Any suitable beamforming technique (e.g., delay-and-sum, MVDR, LCMV, etc.) can be used to estimate a magnitude of the ambient noise.

In another example, a machine learning algorithm, trained to estimate background noise in the presence of or in the absence of speech, can be used. The machine learning algorithm can take into account microphone signal(s) $m_{out}$ or microphone signal(s) $m_{out}$ and accelerometer signals(s) $a_{out}$. Any suitable machine learning algorithm can be used.

Once the noise estimate is obtained, array weights, that weight the relative microphone signal(s) $m_{out}$ and accelerometer signal(s), corresponding to the current detected ambient noise level, are retrieved from a lookup table of a priori array designs. The array weights determine the ratio of the microphone signal component to the accelerometer signal component. Generally, as described above, as the magnitude of the detected ambient noise (e.g., as given by a time average of the microphone signal(s) $m_{out}$) increases, the stored weights increase the magnitude of the accelerometer signal component relative to microphone signal component. In this example, weights for each sensor are stored in the lookup table for a number, greater than two, of discrete ambient noise levels. For example, weights can be stored for 50, 60, 70, 80, 90 dB SPL of detected ambient noise. Of course, these steps are only provided as an example: in alternative examples, the steps can be finer (e.g., every 5 dBSPL) or courser (e.g., every 20 dBSPL) and the range of SPL can be different (e.g., 40-100 dBSPL). Further, the weights applied at any instant in time can correspond to the closest noise level in the lookup table, or interpolation of the weights can be used to generate values that correspond to the present noise level in finer steps.

It should be understood, in general, that the weights are a function of frequency for each sensor and can be applied through time-domain or frequency domain filtering techniques. In an alternative example, however, the weights can be constant with frequency, consisting of the application of broadband gain.

Figure 4:
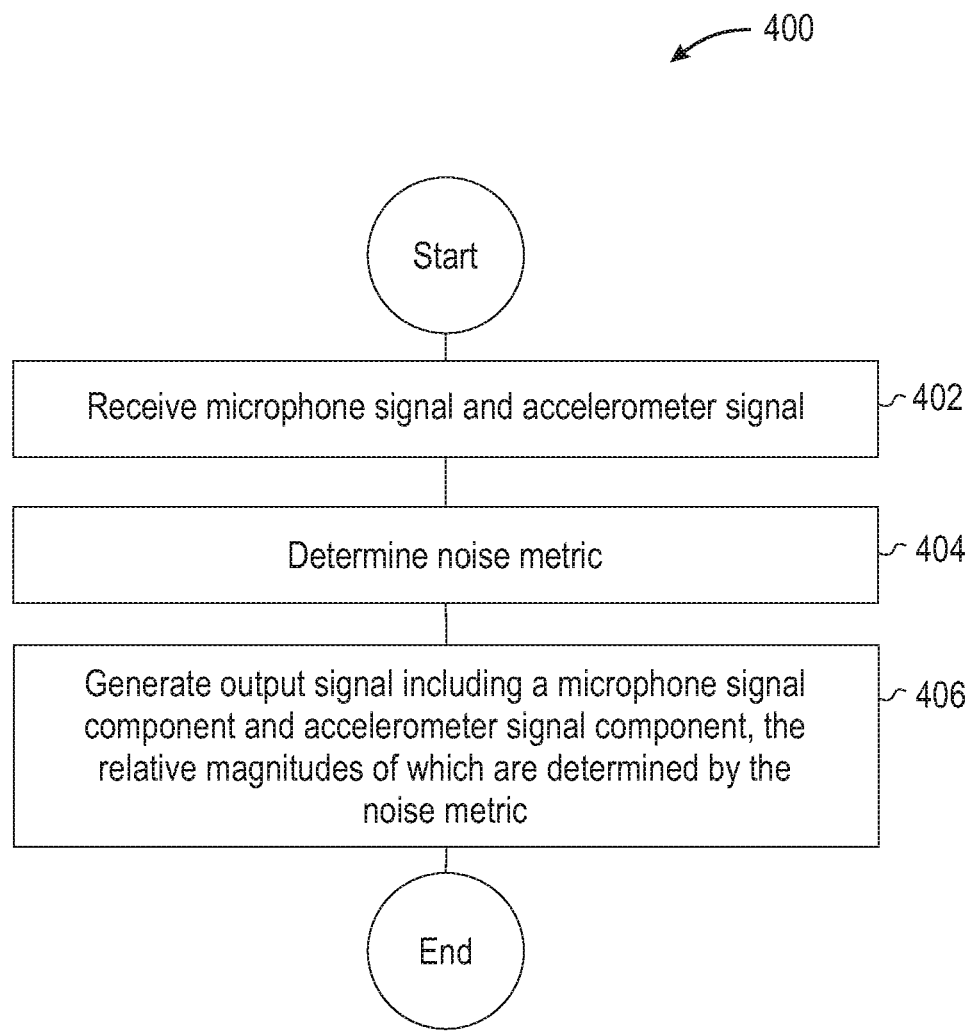
FIG. 4 depicts a flowchart of a method for capturing self-voice using a mixed sensor array, according to an example.

FIG. 4 shows a flowchart of a method 400 for capturing a user's voice with a mixed sensor array disposed in a wearable (e.g., headphones 100 or frames 200). The wearable of method 400 includes at least one microphone (e.g., microphone 102) and at least one accelerometer (e.g., accelerometer 104), each being respectively positioned to capture a user's voice, the location of each sensor being determined, at least in part, according to the type, characteristic, and number of sensors employed. The steps of method 400 can be implemented, for example, as steps defined in program code stored on a non-transitory storage medium and executed by a processor of a controller (e.g., controller 300) disposed within the wearable or in communication with the wearable (e.g., by a wired or wireless connection). Alternatively, the method steps can be carried out by the wearable or another device using a combination of hardware, firmware, and/or software.

At step 402, the microphone signal and accelerometer signal are received from the microphone and accelerometer, respectively. At step 404, a noise metric representative of a magnitude of the ambient noise is determined. The noise metric can be determined using the microphone signal and accelerometer signal; however, in various alternative examples, the noise metric can be determined using the microphone signal in combination with a second microphone signal from another microphone disposed in or near the wearable or from a different set of one or more sensors (i.e., with signals other than the microphone signal and/or accelerometer signal).

At step 404, a noise metric can be calculated. The noise metric can be calculated according to, for example, a time average of a microphone signal. The time average can be spectrally weighted or averaged across frequency. Furthermore, the time average can be taken only when the user is not speaking, which can be determined according any suitable voice activity detector. Examples of suitable voice activity detectors include comparing an accelerometer input to a threshold level or by determining the sign of a phase difference between multiple microphones disposed on the device.

In another example, and array of microphones can be used to form a beam that excludes the user's voice, a magnitude of the beam forming the ambient noise estimate. Because there will be some leakage of user speech into this noise beam, a second beam can be directed at the user to isolate the speech. The speech signal can then be used to generate an estimate of leakage speech in the noise beam so that compensation can be applied to improve the noise estimate. Any suitable beamforming technique (e.g., delay-and-sum, MVDR, LCMV, etc.) can be used to estimate a magnitude of the ambient noise.

In an alternative example, the noise metric can be calculated, in the presence of or absence of user speech, with a machine learning algorithm. The machine learning algorithm can take into account microphone signal(s) $m_{out}$ or microphone signal(s) $m_{out}$ and accelerometer signals(s) $a_{out}$. Any suitable machine learning algorithm can be used.

At step 406, an output signal is generated that includes a microphone signal component and an accelerometer signal component. The relative magnitudes of the microphone signal component and the accelerometer signal component (i.e., the ratio of the two signal components) is determined, at least in part, by the noise metric determined at step 404. If the noise metric indicates that the ambient noise is low (i.e., microphone signal is of good clarity and quality) then the output signal mix will predominantly feature the microphone signal component, because this will produce the highest quality output signal. If, however, the noise metric indicates that the ambient noise is high (i.e., the microphone signal is not of good quality and clarity) then the output signal mix will predominantly feature the accelerometer signal component because this will offer the highest self-voice clarity in the presence of noise.

The mix can be determined according to a lookup table. For example, array weights, that weight the relative microphone signal(s) $m_{out}$ and accelerometer signal(s), corresponding to the current detected ambient noise level, can be retrieved from a lookup table of a priori array designs. The array weights determine the ratio of the microphone signal component to the accelerometer signal component. In this example, weights for each sensor are stored in the lookup table for a number, greater than two, of discrete ambient noise levels. For example, weights can be stored for 50, 60, 70, 80, 90 dBSPL of detected ambient noise. Of course, these steps are only provided as an example: in alternative examples, the steps can be finer (e.g., every 5 dBSPL) or courser (e.g., every 20 dBSPL) and the range of SPL can be different (e.g., 40-100 dBSPL). Further, the weights applied at any instant in time can correspond to the closest noise level in the lookup table, or interpolation of the weights can be used to generate values that correspond to the present noise level in finer steps.

It should be understood, in general, that the weights are a function of frequency for each sensor and can be applied through time-domain or frequency domain filtering techniques. In an alternative example, however, the weights can be constant with frequency, consisting of the application of broadband gain.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A wearable for capturing self-voice using a mixed sensor array, comprising:
   a microphone generating a microphone signal and positioned to capture a user's voice;
   an accelerometer generating an accelerometer signal and positioned to capture the user's voice; and
   a controller receiving the microphone signal and the accelerometer signal and configured to generate a mixed output signal, wherein the mixed output signal comprises a microphone signal component and an accelerometer signal component, wherein the controller is configured to adjust a ratio of the microphone signal component and the accelerometer signal component in response to a value of a noise metric representing a magnitude of ambient noise, the accelerometer signal component and the microphone signal component being nonzero.

2. The wearable of claim 1, further comprising a second microphone generating a second microphone signal, wherein the microphone signal component is comprised of the microphone signal and the second microphone signal.

3. The wearable of claim 1, further comprising a second accelerometer generating a second accelerometer signal, wherein the accelerometer signal component is comprised of the accelerometer signal and the second accelerometer signal.

4. The wearable of claim 1, wherein the noise metric is determined according to a time-average of the microphone signal.

5. The wearable of claim 4, wherein the time average of the microphone signal is calculated when a voice activity detector does not detect the user's voice.

6. The wearable of claim 4, wherein the time average is spectrally weighted.

7. The wearable of claim 1, wherein the noise metric is determined according to a machine learning algorithm.

8. The wearable of claim 2, wherein the noise metric is determined according to a magnitude of a beam formed from, at least, the first microphone signal and the second microphone signal, the beam being directed to exclude the user's voice.

9. The wearable of claim 1, wherein the ratio of the microphone signal component and the accelerometer signal component is determined according weights stored in a look up table.

10. The wearable of claim 1, wherein the wearable comprises one of: headphones, earbuds, glasses, or a mobile device.

11. A method for capturing self-voice with a mixed sensor array, comprising:
   receiving a microphone signal from a microphone positioned to capture a user's voice;
   receiving an accelerometer signal from an accelerometer positioned to capture the user's voice;
   generating a mixed output signal comprising a microphone signal component and an accelerometer signal component; and
   adjusting a ratio of the microphone signal component and the accelerometer signal component in response to a value of a noise metric representing a magnitude of ambient noise, the accelerometer signal component and the microphone signal component being nonzero.

12. The method of claim 11, further comprising the step of receiving a second microphone signal from a second microphone, wherein the microphone signal component is comprised of the microphone signal and the second microphone signal.

13. The method of claim 11, further comprising the step of receiving a second accelerometer signal from a second accelerometer, wherein the accelerometer signal component is comprised of the accelerometer signal and the second accelerometer signal.

14. The method of claim 11, wherein the noise metric is determined according to a time-average of the microphone signal.

15. The method of claim 14, wherein the time average of the microphone signal is calculated when a voice activity detector does not detect the user's voice.

16. The method of claim 14, wherein the time average is spectrally weighted.

17. The method of claim 11, wherein the noise metric is determined according to a machine learning algorithm.

18. The method of claim 12, wherein the noise metric is determined according to a magnitude of a beam formed from, at least, the first microphone signal and the second microphone signal, the beam being directed to exclude the user's voice.

19. The method of claim 11, wherein the ratio of the microphone signal component and the accelerometer signal component is determined according weights stored in a look up table.

20. The method of claim 11, wherein the wearable comprises one of: headphones, earbuds, glasses, or a mobile device.

* * * * *